US011879605B1

(12) United States Patent
Guo

(10) Patent No.: US 11,879,605 B1
(45) Date of Patent: Jan. 23, 2024

(54) MAGNETIC SWAYING ELECTRONIC CANDLE

(71) Applicant: Chang Zhou Man Mei Industrial Co., Ltd., Changzhou (CN)

(72) Inventor: Lei Guo, Changzhou (CN)

(73) Assignee: CHANG ZHOU MAN MEI INDUSTRIAL CO., LTD., Changzhou (CN)

( * ) Notice: Subject to any disclaimer, the term of this patent is extended or adjusted under 35 U.S.C. 154(b) by 0 days.

(21) Appl. No.: 18/218,595

(22) Filed: Jul. 6, 2023

(30) Foreign Application Priority Data

Feb. 15, 2023 (CN) ......................... 202310115103.1

(51) Int. Cl.
*F21S 10/04* (2006.01)
*F21V 14/08* (2006.01)

(52) U.S. Cl.
CPC ............ *F21S 10/046* (2013.01); *F21V 14/08* (2013.01)

(58) Field of Classification Search
CPC ................................ F21S 10/04; F21S 10/046
USPC .......................................................... 362/277
See application file for complete search history.

(56) References Cited

U.S. PATENT DOCUMENTS 7,360,918 B2 * 4/2008 Trombetta ............. H05B 45/37 362/183
7,837,355 B2 * 11/2010 Schnuckle ................ F21K 9/23 362/249.02
8,438,780 B1 * 5/2013 Malavenda .............. A01G 5/02 47/58.1 CF
9,541,247 B2 * 1/2017 Patton ..................... F21S 6/001
9,574,748 B2 * 2/2017 Dong ...................... F21V 14/08
9,752,740 B1 * 9/2017 Li ......................... F21V 33/004
9,915,402 B2 * 3/2018 Dong .................... F21S 10/046
2006/0034100 A1 * 2/2006 Schnuckle .............. F21V 13/14 362/362
2007/0127249 A1 * 6/2007 Medley .................. A61L 9/122 362/392
2019/0017669 A1 * 1/2019 Boldsen .................. F21S 6/001
2019/0072251 A1 * 3/2019 Carpintero ............. H05B 47/16
2022/0341555 A1 * 10/2022 Sena ....................... F21S 6/001

* cited by examiner

*Primary Examiner* — Christopher M Raabe
(74) *Attorney, Agent, or Firm* — Bayramoglu Law Offices LLC

(57) ABSTRACT

A magnetic swaying electronic candle includes a cylindrical support, a support base and a cylindrical housing, where the cylindrical support is sleeved inside the cylindrical housing, the support base is fixedly connected to the bottom of the cylindrical housing, a candle cover is fixedly connected to the top of the cylindrical housing, and the candle cover, the cylindrical housing and the cylindrical support form a receiving space. An electromagnet is repulsed against magnetism from and is homopolar to an opposite side to a magnet ring. When a PCB board is powered on, the electromagnet is energized to generate magnetism; when a magnet ring is close to the electromagnet with magnetism, the electromagnet will push the magnet ring away in an opposite direction; and when the magnet ring sways to a vertical position, the electromagnet will be energized again, and push the magnet ring away again.

9 Claims, 7 Drawing Sheets

MAGNETIC SWAYING ELECTRONIC CANDLE

CROSS REFERENCE TO THE RELATED APPLICATIONS

This application is based upon and claims priority to Chinese Patent Application No. 202310115103.1, filed on Feb. 15, 2023, the entire contents of which are incorporated herein by reference.

TECHNICAL FIELD

The present disclosure relates to the technical field of electronic candles, in particular to a magnetic swaying electronic candle.

BACKGROUND

In some special occasions, in order to reduce emissions of carbon dioxide and fire disasters, people often use electronic candles with similar appearance to traditional candles instead of the traditional candles, which can be widely used in people's daily life because of their characteristics of safety, environmental protection, nice appearance and protection from flame accidents.

At present, however, when using electronic candles, they can only be used for illumination. A candle wick is generally stationary and thus the flame cannot sway like that of a traditional candle when the candle is burning. Therefore, an effect of burning like a real flame cannot be achieved, thus losing the authenticity brought about by using traditional candles as a replacement with unpleasant experience.

SUMMARY

It is an object of the present disclosure to provide a magnetic swaying electronic candle that addresses the shortcomings of the prior art.

In order to achieve the above object, the present disclosure adopts the following technical scheme:

a magnetic swaying electronic candle including a cylindrical support, a support base and a cylindrical housing, where the cylindrical support is sleeved inside the cylindrical housing, the support base is fixedly connected to the bottom of the cylindrical housing, a candle cover is fixedly connected to the top of the cylindrical housing, and the candle cover, the cylindrical housing and the cylindrical support form a receiving space, where a central support is arranged in the middle of the receiving space, the central support is flexibly connected to the cylindrical support via a power supply line, a primary support is connected to the center of the central support, a plurality of groups of fiber wires are flexibly connected to an outer surface of the primary support, the ends of the fiber wires are wound and connected to the central support, and a head-holding support is fixedly connected to the top of the primary support; a central through hole is formed in the center of the candle cover, one end of the head-holding support remote from the primary support goes through the central through hole and extends to the outside of the receiving space and is connected to a candle wick, a LED lamp bead is arranged inside the candle wick, and a power supply assembly is connected to the bottom of the LED lamp bead. The primary support and the head-holding support are placed in a receiving space, and the candle wick is placed in the central through hole, so that the electronic candle can be used instead of the traditional candle, making the electronic candle safer and more environmentally friendly, and avoiding fires caused by mistakes like the traditional candle.

Preferably, the power supply assembly includes a magnet ring located at the bottom of the primary support, a connection line is connected to the top of the magnet ring, one end of the connection line successively goes through the primary support, the head-holding support and the candle wick and is electrically connected to the LED lamp bead, a PCB board is arranged on the cylindrical support, an electromagnet cooperating with the magnet ring is fixedly connected at the center of the PCB board, a battery holder is arranged in the support base and is loaded therein with a battery, and a remote control system is further arranged in an inner wall of the support base. When the PCB board is powered on by a power supply assembly, the electromagnet is then energized to generate magnetism; when the magnet ring is close to the electromagnet, the magnet ring sways continuously due to the mutual repulsive force between the magnet ring and the electromagnet; the magnet ring sways to drive the primary support to sway with the head-holding support; the head-holding support sways to drive the candle wick to sway; and when the candle wick sways, it can simulate a situation where a flame of a traditional candle sways when the candle is burning, achieving an effect of burning like a real flame.

Preferably, the bottom of the PCB board is provided with a recess, and the top of the cylindrical support is fixedly connected to a clamping block cooperating with the recess. The PCB board can be fixed on a base by being clamped in the recess at the bottom of the PCB board via a clamping block, so that the PCB board would not sway after being energized.

Preferably, the inner wall of the cylindrical support is symmetrically provided with a clamping groove, a limiting hole is arranged in the clamping groove, one end of the power supply line is wound at an outer surface of the central support, one end of the power supply line away from the central support goes through the limiting hole and extends to the inside of a PCB board and is connected with a connection wire, the ends of the connection wire successively go through the cylindrical housing, and the support base extends to the inside of the battery holder and is electrically connected to the battery in the battery holder. When the PCB board is energized, through the provided connection wire and power supply line, the current is energized to the power supply line after the power supply is switched on; and the power supply line, while giving a stable force to the central support, also enables the magnet ring to have a good current-carrying capacity-increasing effect.

Preferably, an outer surface of the candle wick is sleeved with a protection shell, and the protection shell, the candle wick and the LED lamp bead are all flame shaped. By providing a protection shell, the candle wick can be effectively protected from damage, the situation of burning a traditional candle can be vividly simulated by providing both the protection shell and the candle wick with a flame a shape.

Preferably, an outer wall of the central support is provided with a plurality of through holes, one end of the fiber wire extends into the through holes in a C shape and is connected to the central support, the other end of the fiber wire is wound uniformly in a ring shape at the outer surface of the primary support, and the fiber wire is curled with the swaying of the primary support. By moving the candle wick to sway manually, a primary support is driven to sway, so that the kinetic energy manually applied is converted into the potential energy of the fiber wire. When the fiber wire is powered on, the potential energy of the fiber wire is released, the potential energy is converted into mechanical kinetic energy, and mechanical energy is transmitted to the primary support, so that when there is no need to move the candle wick manually, the primary support can continue to sway, and the head-holding support is driven to sway together with the candle wick.

Preferably, the remote control system includes a receiver and a central processing unit in the support base, a sound control system and a light control system are successively arranged in the inner wall of the support base, and the sound control system, the light control system, the receiver and the LED lamp bead are all electrically connected to the central processing unit. The remote control system is controlled by an external remote controller, the receiver receives a control pulse signal sent from the remote controller and transmits the signal to a central processing unit, and the central processing unit controls the LED lamp bead to illuminate, so that a situation where a the flame of a burning traditional candle illuminates is vividly simulated.

Preferably, an outer surface of the support base is provided with a control switch, and the control switch, the battery, an electromagnet, the magnet ring, the fiber wire, the power supply line, the connection wire, the LEI) lamp bead, and the connection line are all electrically connected to the PCB board. With the control switch provided, by turning on the control switch, the electromagnet can be controlled to energize and cause the LED lamp bead to illuminate, thus simulating a situation where a conventional candle is being used.

Preferably, the electromagnet is repulsed against magnetism from and is homopolar to an opposite side to a magnet ring. An electromagnet is repulsed against magnetism from an opposite side to a magnet ring, so that when the electromagnet is energized to generate magnetism, the electromagnet pushes the magnet ring away in an opposite direction; and when the magnet ring and the electromagnet come close again, they repulse each other when the electromagnet is energized again, and the magnet ring is pushed away again, so that the magnet ring always sways continuously, thus driving the candle wick to sway continuously, and finally simulating a situation where the flame sway like that of a traditional candle when the candle is burning.

Advantageous effects of the present disclosure are as follows: an electromagnet is repulsed against magnetism from and is homopolar to an opposite side to a magnet ring. When a PCB board is powered on, the electromagnet is energized to generate magnetism; when a magnet ring is close to the electromagnet with magnetism, the electromagnet will push the magnet ring away in an opposite direction; and when the magnet ring sways to a vertical position, the electromagnet will be energized again to repulse against the magnet ring, and push the magnet ring away again. The electromagnet is repeatedly switched on and off in a cycle to make the magnet ring sway in disorder, and the magnet ring will drive a primary support, a head-holding support and a candle wick sway together, vividly simulating a situation where a flame of a traditional candle sways when the candle is burning when the candle wick sways in disorder, achieving an effect of burning like a real flame of the traditional candle, and has a better simulation effect.

By injection molding a fiber wire into a central support, there is no need to manually wind the fiber wire into the central support with difficulty. When the PCB board is energized electricity, the current flows to the fiber wire at the same time. After the fiber wire is energized, the magnet ring has good current-carrying capacity-increasing effect while effectively consuming the hysteresis loss and heat loss caused by the fiber wire.

When the candle wick is moved manually, the LEI) lamp bead sways together with the candle wick, at this time, the kinetic energy manually applied to the candle wick is converted into torque potential energy of the fiber wire. When the fiber wire is powered on, the torque potential energy is released, so that the torque potential energy is converted into mechanical potential energy which is transmitted to a primary support. When the candle wick is moved manually once, the mechanical energy can make the primary support sway, and when the primary support sways, the head-holding support sways together with the candle wick, so that the candle wick can also sway without being moved manually, so that the electronic candle looks more real in use.

The remote control system can enable people to control the electronic candle to be automatically turned on and off when they are away from the electronic candle via a remote controller, so that the magnetic swaying electronic candle achieves an effect of "turning on with coming of a man while turning off with leaving of a man".

1: cylindrical support; 2: PCB board; 3: electromagnet; 4: magnet ring; 5: primary support; 6: head-holding support; 7: candle wick; 8: central through hole; 9: central support; 10: fiber wire; 11: power supply line; 12: clamping groove; 13: limiting hole; 14: clamping block; 15: connection wire; 16: support base; 17: battery holder; 18: LED lamp bead; 19: candle cover; 20: receiving space; 21: cylindrical housing; and 22: connection line.

DETAILED DESCRIPTION OF THE EMBODIMENTS

The technical schemes in embodiments of the present disclosure will be described more clearly and fully herein-after with reference to the accompanying drawings of the embodiments of the present disclosure. It is to be understood that the ones described are only a part rather all of the embodiments of the present disclosure.

Contents that are not described in detail in this description is prior art known to a person skilled in the art.

Standard parts used in the present disclosure are all commercially available, the irregular parts can be customized according to what is specified in the description and drawings. The specific connection methods of each part are conventional means such as bolts, rivets and welding which are mature in the prior art. The machinery, parts and equipment are conventional models in the prior art. The circuit connection is conventional connection methods in the prior art, which will not be described in detail here.

Figure 1:
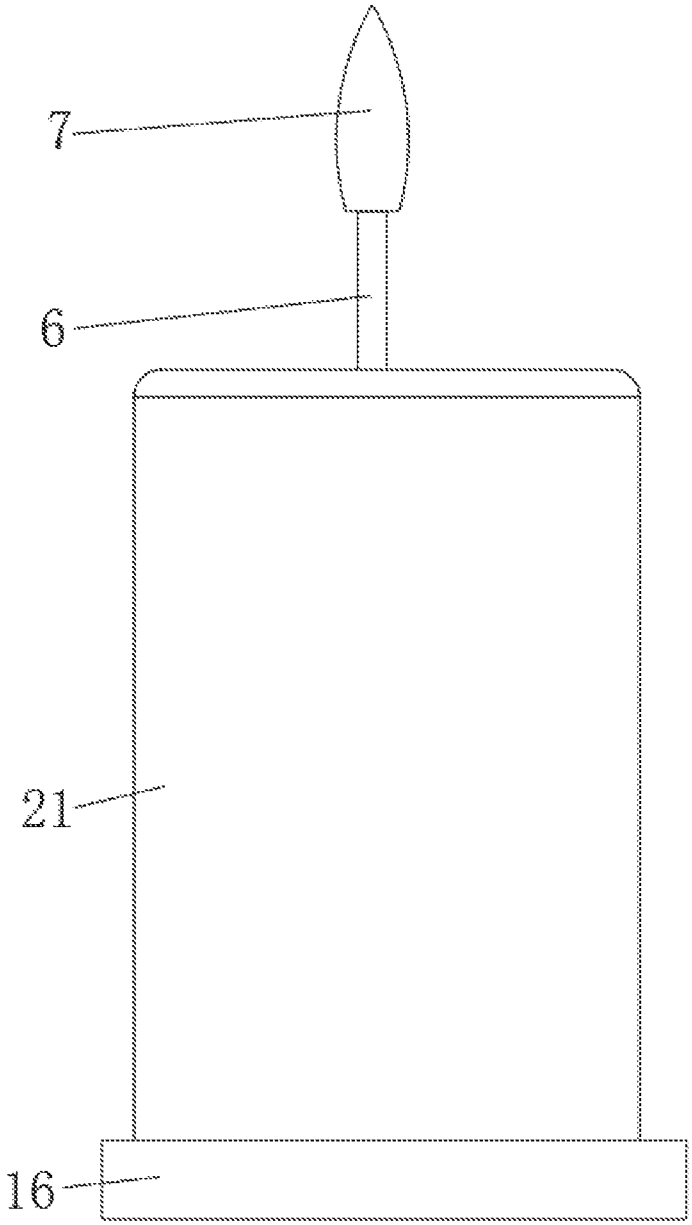
FIG. 1 is a schematic view showing a whole structure of the magnetic swaying electronic candle according to the present disclosure.
Figure 2:
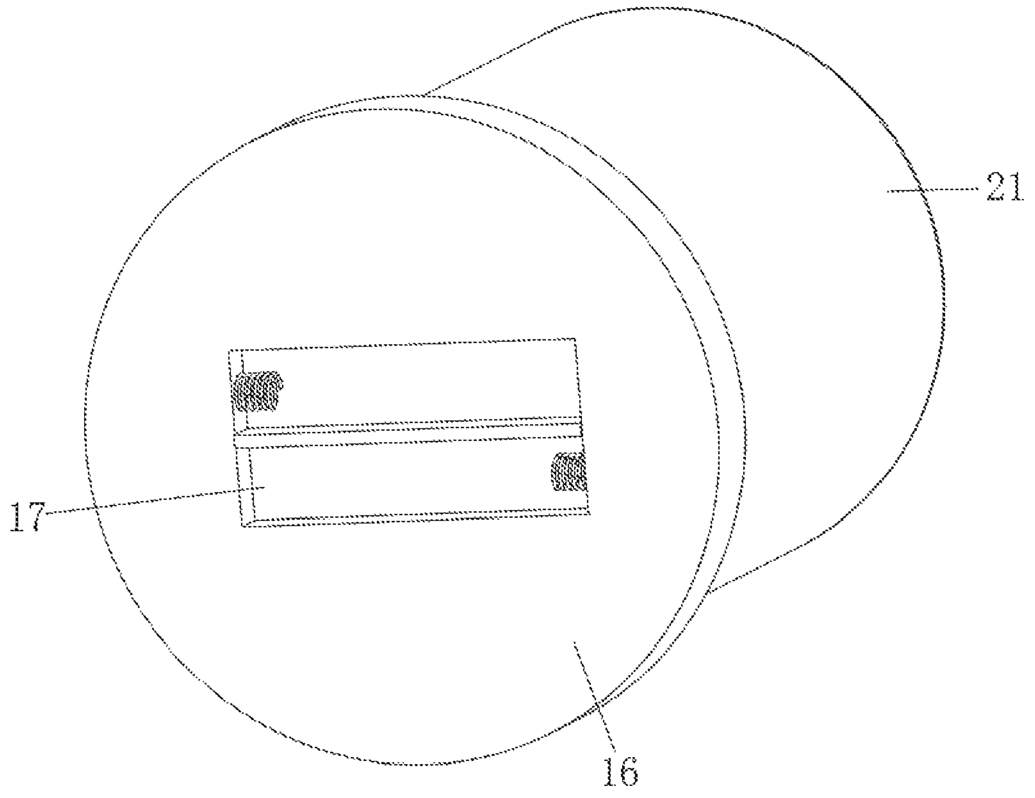
FIG. 2 is a schematic view showing a bottom structure of the magnetic swaying electronic candle according to the present disclosure.
Figure 3:
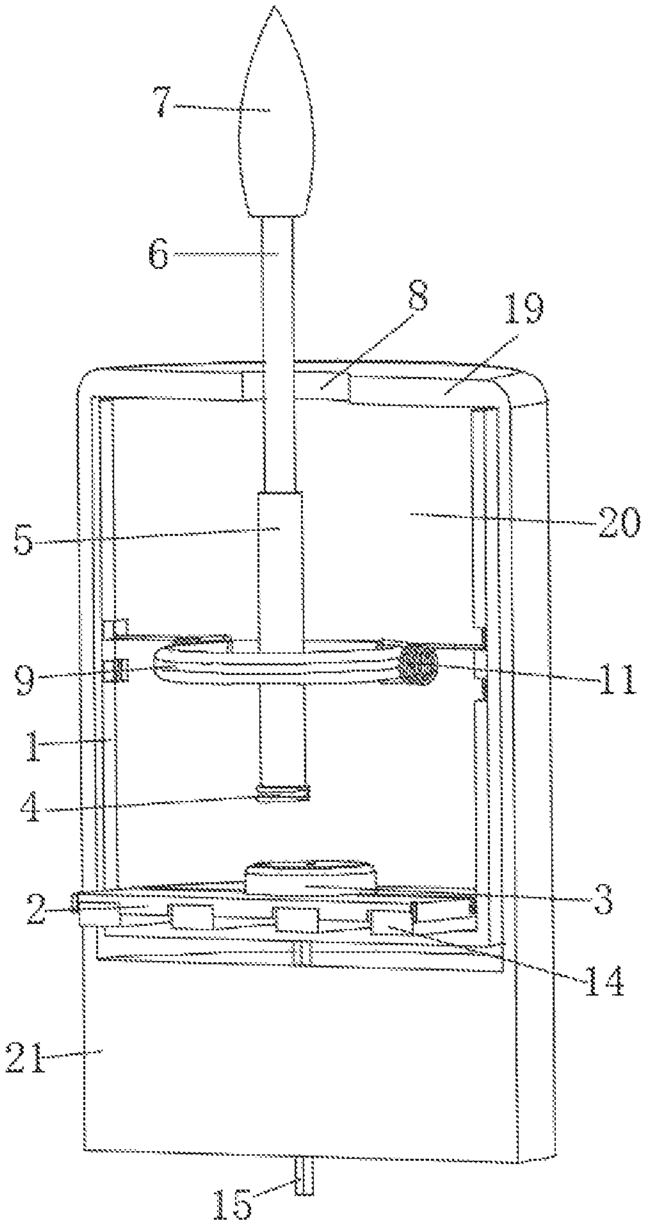
FIG. 3 is a schematic view showing an interior structure of a cylindrical housing of the magnetic swaying electronic candle according to the present disclosure.
Figure 4:
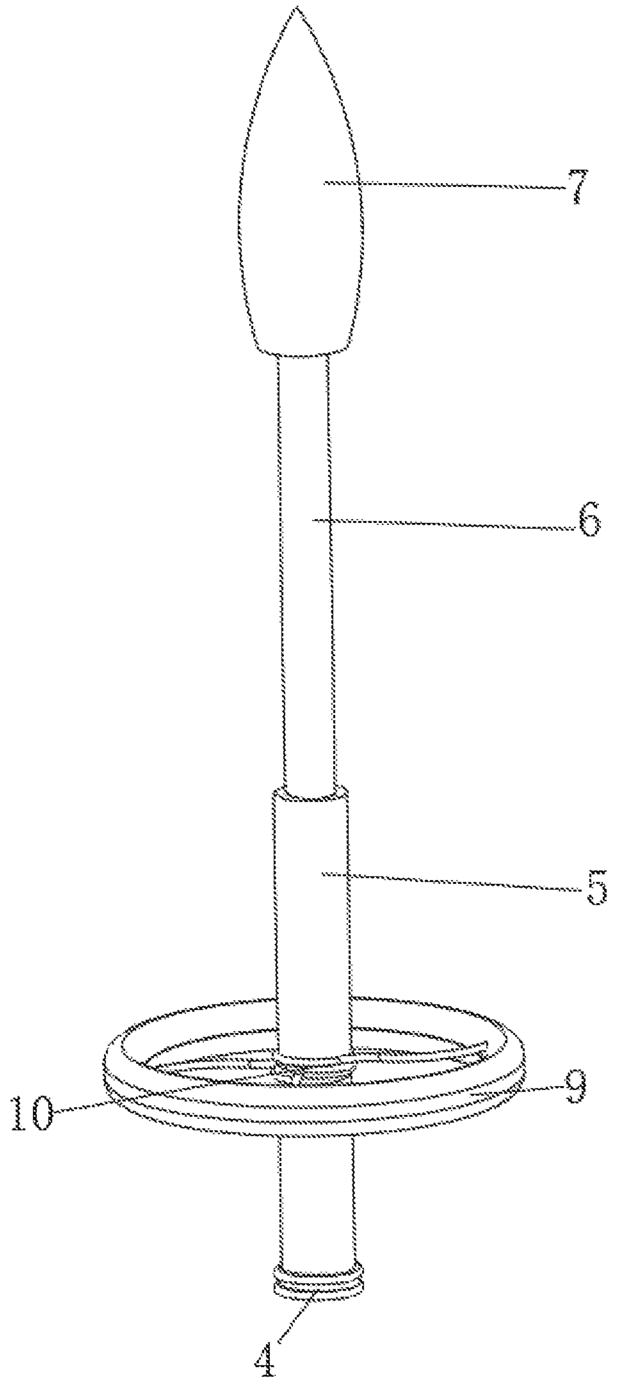
FIG. 4 is a schematic view showing a connection structure of a candle wick and a central support of the magnetic swaying electronic candle according to the present disclosure.
Figure 5:
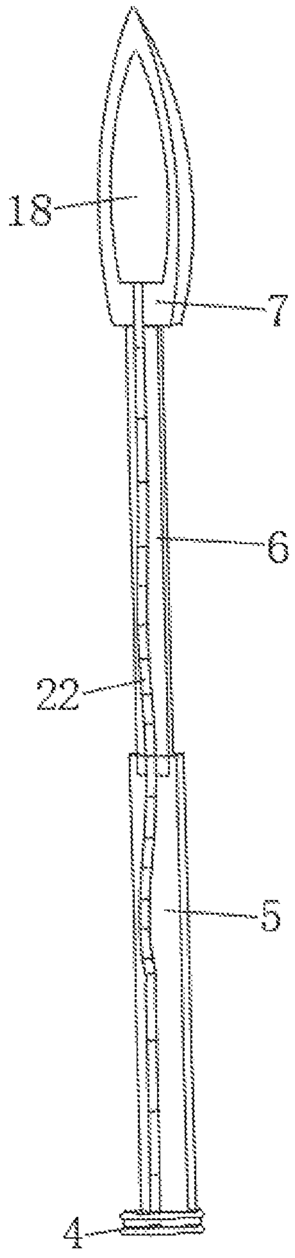
FIG. 5 is a schematic cross-sectional view showing a primary support, a head-holding support, and the candle wick of the magnetic swaying electronic candle according to the present disclosure.
Figure 6:
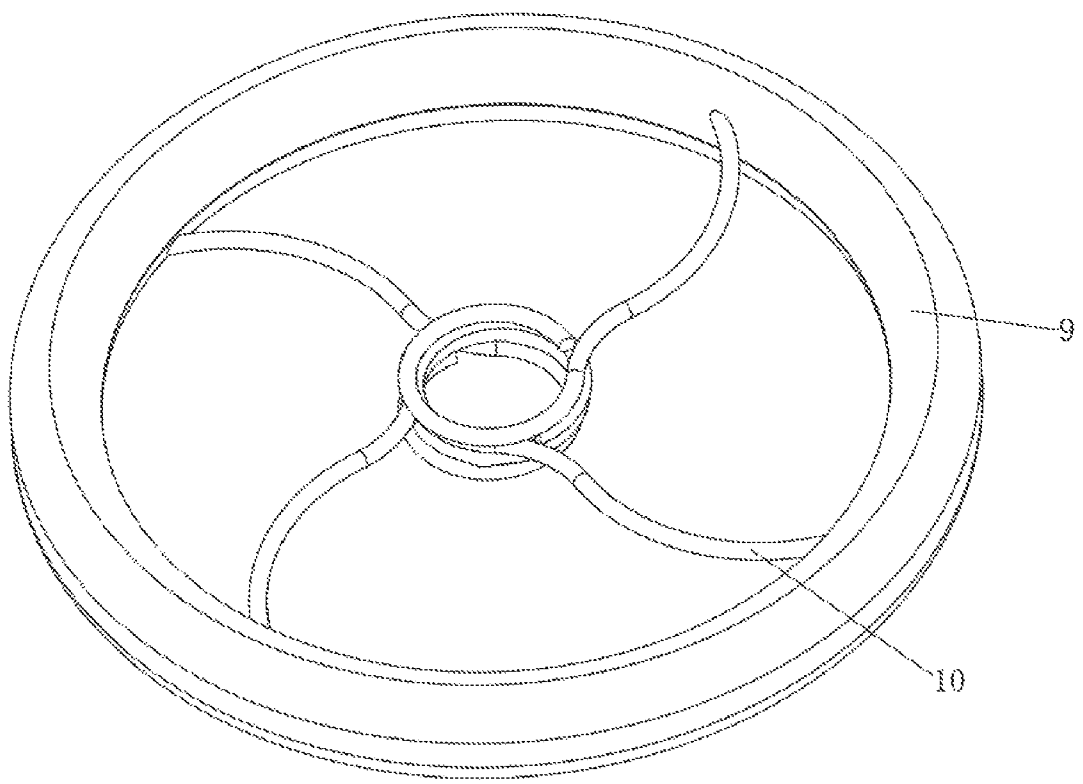
FIG. 6 is a schematic view showing a connection structure of the central support and a fiber wire of the magnetic swaying electronic candle according to the present disclosure.
Figure 7:
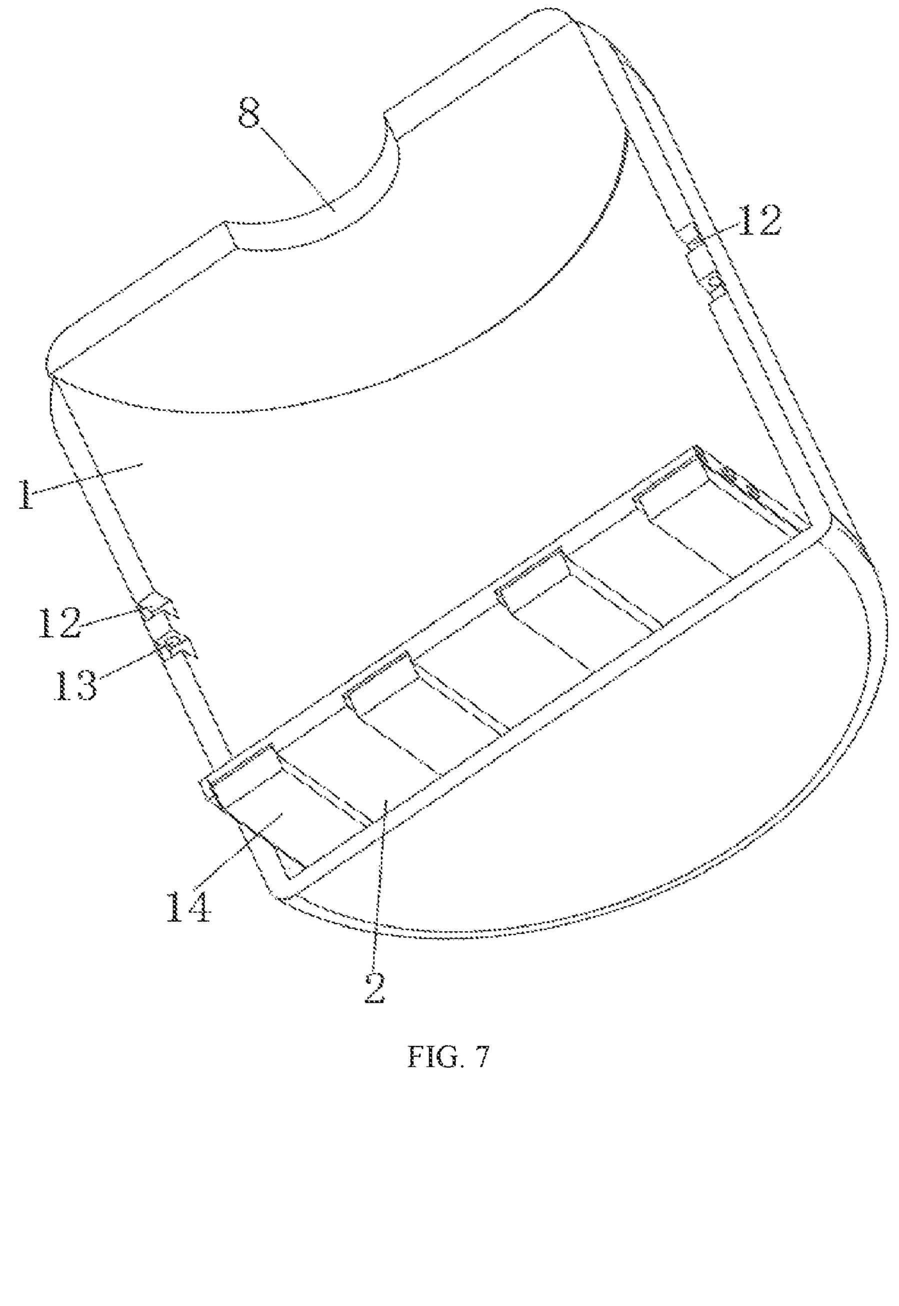
FIG. 7 is a schematic view showing an interior structure of a cylindrical support of the magnetic swaying electronic candle according to the present disclosure.

Embodiment I: with reference to FIGS. 1-7, the magnetic swaying electronic candle includes a cylindrical support 1, a support base 16 and a cylindrical housing 21. The cylindrical support 1 is sleeved inside the cylindrical housing 21. The support base 16 is fixedly connected to the bottom of the cylindrical housing 21. A candle cover 19 is fixedly connected to the top of the cylindrical housing 21. The candle cover 19, the cylindrical housing 21 and the cylindrical support 1 form a receiving space 20.

A central support 9 is arranged in the middle of the receiving space 20. The central support 9 is flexibly connected to the cylindrical support 1 via a power supply line 11. A primary support 5 is connected to the center of the central support 9. A plurality of groups of fiber wires 10 are flexibly connected to an outer surface of the primary support 5. The ends of the fiber wires 10 are wound and connected to the central support 9. A head-holding support 6 is fixedly connected to the top of the primary support 5. A central through hole 8 is formed in the center of the candle cover 19. One end of the head-holding support 6 remote from the primary support 5 goes through the central through hole 8 and extends to the outside of the receiving space 20 and is connected to a candle wick 7. A LED lamp bead 18 is arranged inside the candle wick 7. A power supply assembly is connected to the bottom of the LED lamp bead 18.

The power supply assembly includes a magnet ring 4 located at the bottom of the primary support 5. A connection line 22 is connected to the top of the magnet ring 4, One end of the connection line 22 successively goes through the primary support 5, the head-holding support 6 and the candle wick 7 and is electrically connected to the LED lamp bead 18. A PCB board 2 is arranged on the cylindrical support 1. An electromagnet 3 cooperating with the magnet ring 4 is fixedly connected at the center of the PCB board 2. A battery holder 17 is arranged in the support base 16 and is loaded therein with a battery. A remote control system is further arranged in the inner wall of the support base 16.

An outer surface of the candle wick 7 is sleeved with a protection shell, and the protection shell, the candle wick 7 and the LED lamp bead 18 are all flame shaped.

The electromagnet 3 is repulsed against magnetism from and is homopolar to an opposite side to a magnet ring 4.

In this embodiment, when it is required to use the magnetic swaying electronic candle, firstly, by turning on a control switch, a current is transmitted to the PCB board 2 along the connection wire 15, so that the PCB board 2 is powered on. The PCB board 2 is energized, and then the electromagnet 3 is energized. When the PCB board 2 is energized, the current flows to the central support 9 along the power supply line 11, and then the central support 9 is transmitted to the primary support 5 and the magnet ring 4 via the fiber wire 10. At this time, the magnet ring 4 is energized, and the magnet ring 4 transmits a current to the LED lamp bead 18 via a connection line 22. At this time, the LED lamp bead 18 illuminates. The situation of flame burning of a traditional candle can be simulated. When the magnet ring 4 is powered on, magnetism will be generated. Since the electromagnet 3 is repulsed against magnetism from and is homopolar to an opposite side to a magnet ring 4, when the electromagnet 3 and the magnet ring 4 are powered on at the same time, the electromagnet 3 with magnetism will push the magnet ring 4 away in an opposite direction; and when the magnet ring 4 sways to a vertical position, the electromagnet 3 will be energized again when it is close to the electromagnet 3, and repulses against the electromagnet 3, and the magnet ring 4 is pushed away again. Therefore, the electromagnet 3 is repeatedly switched on and off in a cycle, so that the magnet ring 4 sways continuously. When the magnet ring 4 sways continuously, the primary support 5 and the head-holding support 6 are driven to sway continuously. When the head-holding support 6 sways, the candle wick 7 and the LED lamp bead 18 sway in disorder in all directions in the central through-hole 8. When the candle wick 7 sways, a situation where the flame of the traditional candle sways continuously when the candle is burning can be simulated, so that the electronic candle looks more real in use.

Embodiment with reference to FIGS. 1-7, on the basis of Embodiment I, a technical scheme of a magnetic swaying electronic candle is provided. An outer wall of a central support 9 is provided with a plurality of through holes. One end of a fiber wire 10 extends into the through holes in a C shape and is connected to the central support 9, and the other end of the fiber wire 10 is uniformly wound in a ring shape at the outer surface of a primary support 5. The fiber wire 10 is curled with the swaying of the primary support 5.

The bottom of the PCB board 2 is provided with a recess, and the top of the cylindrical support 1 is fixedly connected to a clamping block 14 cooperating with the recess.

In this embodiment, the clamping block 14 is clamped into the recess to fit the clamping block 14 with the PCB board 2 to maintain the stability of the PCB board 2 after being powered on. When a control switch is turned on, a LED lamp bead 18 illuminates. At this time, when the candle wick 7 is moved manually, the LED lamp bead 18 sways together with the candle wick 7. When the candle wick 7 sways, the kinetic energy manually applied to the candle wick 7 is converted into the torque potential energy of the fiber wire 10 located on the central support 9. When the fiber wire 10 is powered on, the potential energy on the fiber wire 10 is released, thereby converting the potential energy on the fiber wire 10 into mechanical potential energy, and then transmitting the mechanical potential energy to the primary support 5. When the candle wick 7 is moved manually once, the mechanical energy can make the primary support 5 sway. When the primary support 5 sways, the head-holding support 6 is driven to sway together with the candle wick 7, so that the candle wick 7 can also sway without being moved manually, so that the electronic candle looks more real in use.

Embodiment III: with reference to FIGS. 1-7, on the basis of Embodiment I, provided is a technical scheme of a magnetic swaying electronic candle. An inner wall of the cylindrical support 1 is symmetrically provided with a clamping groove 12. A limiting hole 13 is arranged in the clamping groove 12. One end of the power supply line 11 is wound at an outer surface of the central support 9, and one end of the power supply line 11 away from the central support 9 goes through the limiting hole 13 and extends to the inside of a PCB board 2 and is connected with a connection wire 15. The ends of the connection wire 15 successively go through the cylindrical housing 21. The support base 16 extends to the inside of the battery holder 17 and is electrically connected to the battery in the battery holder 17.

The remote control system includes a receiver and a central processing unit in the support base 16. A sound control system and a light control system are successively arranged in the inner wall of the support base 16. The sound control system, the light control system, the receiver and the LED lamp bead 18 are all electrically connected to the central processing unit.

An outer surface of the support base 16 is provided with a control switch. The control switch, a battery, an electromagnet 3, a magnet ring 4, a fiber wire 10, a power supply line 11, a connection wire 15, a LED lamp bead 18 and a connection line 22 are all electrically connected to the PCB board 2.

In this embodiment, the sound control system includes a lamp load photosensitive triode, a silicon controlled rectifier, a microphone, a sound control circuit and a light control circuit. The LED lamp bead 18 is connected to the switch circuit after being connected in series with the silicon controlled rectifier SCR. When the daylight is strong, the switch circuit is in a self-locking state. At this time, the collector electrode and the emitter electrode of the photosensitive triode cannot be energized, the LED lamp bead 18 does not illuminate, and the LED lamp bead 18 can be controlled to be turned on by controlling a control switch at the bottom of the support base 16 or an external remote controller. When the remote controller is used for controlling, the remote controller generates different encoding pulses to output various control pulse signals mediated by infrared rays. A receiver amplifies, clips, detects and shapes the received infrared signals, and then sends same to a central processing unit. The central processing unit sends out a control signal to a corresponding control circuit according to different signals. Then the control circuit can control the LED lamp bead 18 to turn on. When it is in the evening or relatively dark, the switch circuit enters a preparatory state. When there is sound, the microphone converts the sound signal into an electrical signal, so that the switch circuit is turned on. The LED lamp bead 18 is turned on, and is automatically turned off after a time delay, so that an effect of "turning on with coming of a man while turning off with leaving of a man" is achieved.

In the description of the present disclosure, it is to be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like, indicate orientations or positional relationships based on those shown in the drawings, merely for convenience of description and simplification of the description, and do not indicate or imply that the device or element referred to must have a particular orientation, be constructed in a particular orientation, and be operated, and thus, are not to be construed as limiting the present disclosure.

Furthermore, the terms "first" and "second" are used for descriptive purposes only and are not to be construed as indicating or implying relative importance or implicitly indicating the number of technical features indicated. Thus, a feature defined as "first" or "second" may explicitly or implicitly include one or more of the stated features. In the description of the present disclosure, "a plurality of" refers to two or more unless specifically defined otherwise.

Although the above is merely exemplary embodiments of the present disclosure, the protection scope of the present disclosure is not limited thereto, and equivalent substitutions and modifications made by any person skilled in the art according to the technical scheme and inventive concept of the present disclosure shall be within the protection scope of the present disclosure.

What is claimed is:

1. A magnetic swaying electronic candle comprising a cylindrical support, a support base and a cylindrical housing, wherein the cylindrical support is sleeved inside the cylindrical housing, the support base is fixedly connected to a bottom of the cylindrical housing, a candle cover is fixedly connected to a top of the cylindrical housing, and the candle cover, the cylindrical housing and the cylindrical support form a receiving space, wherein a central support is arranged in a middle of the receiving space, the central support is flexibly connected to the cylindrical support via a power supply line, a primary support is connected to a center of the central support, a plurality of groups of fiber wires are flexibly connected to an outer surface of the primary support, ends of the plurality of groups of fiber wires are wound and connected to the central support, and a head-holding support is fixedly connected to a top of the primary support;

a central through hole is formed in a center of the candle cover, one end of the head-holding support remote from the primary support goes through the central through hole and extends to an outside of the receiving space and is connected to a candle wick, a LED lamp bead is arranged inside the candle wick, and a power supply assembly is connected to a bottom of the LED lamp bead.

2. The magnetic swaying electronic candle according to claim 1, wherein the power supply assembly comprises a magnet ring located at a bottom of the primary support, a connection line is connected to a top of the magnet ring, one end of the connection line successively goes through the primary support, the head-holding support and the candle wick and is electrically connected to the LED lamp bead, a PCB board is arranged on the cylindrical support, an electromagnet is fixedly connected at a center of the PCB board, wherein the electromagnet cooperates with the magnet ring, a battery holder is arranged in the support base and is loaded therein with a battery, and a remote control system is further arranged in an inner wall of the support base.

3. The magnetic swaying electronic candle according to claim 2, wherein a bottom of the PCB board is provided with a recess, and a top of the cylindrical support is fixedly connected to a clamping block cooperating with the recess.

4. The magnetic swaying electronic candle according to claim 1, wherein an inner wall of the cylindrical support is symmetrically provided with a clamping groove, a limiting hole is arranged in the clamping groove, one end of the power supply line is wound at an outer surface of the central support, one end of the power supply line away from the central support goes through the limiting hole and extends to an inside of a PCB board and is connected with a connection wire, ends of the connection wire successively go through the cylindrical housing, and the support base extends to an inside of a battery holder and is electrically connected to a battery in the battery holder.

5. The magnetic swaying electronic candle according to claim 1, wherein an outer surface of the candle wick is sleeved with a protection shell, and the protection shell, the candle wick and the LED lamp bead are flame shaped.

6. The magnetic swaying electronic candle according to claim 1, wherein an outer wall of the central support is provided with a plurality of through holes, a first end of the fiber wire extends into the plurality of through holes in a C shape and is connected to the central support, a second end of the fiber wire is wound uniformly in a ring shape at the outer surface of the primary support, and the fiber wire is curled with a swaying of the primary support.

7. The magnetic swaying electronic candle according to claim 2, wherein the remote control system comprises a receiver and a central processing unit in the support base, a sound control system and a light control system are successively arranged in the inner wall of the support base, and the sound control system, the light control system, the receiver and the LED lamp bead are electrically connected to the central processing unit.

8. The magnetic swaying electronic candle according to claim 2, wherein an outer surface of the support base is provided with a control switch, and the control switch, the battery, the electromagnet, the magnet ring, the fiber wire, the power supply line, a connection wire, the lamp bead and the connection line are electrically connected to the PCB board.

9. The magnetic swaying electronic candle according to claim 2, wherein the electromagnet is repulsed against magnetism from and is homopolar to an opposite side to the magnet ring.

* * * * *